United States Patent
Schydlo et al.

(10) Patent No.: US 10,815,864 B2
(45) Date of Patent: Oct. 27, 2020

(54) TECHNIQUE FOR COOLING FOR AN INTERNAL COMBUSTION ENGINE

(71) Applicant: MAN Truck & Bus AG, Munich (DE)

(72) Inventors: Alexander Schydlo, Munich (DE); Robert Martens, Karlsfeld (DE)

(73) Assignee: MAN TRUCK & BUS AG, Munich (DE)

( * ) Notice: Subject to any disclaimer, the term of this patent is extended or adjusted under 35 U.S.C. 154(b) by 52 days.

(21) Appl. No.: 16/134,533

(22) Filed: Sep. 18, 2018

(65) Prior Publication Data

US 2019/0101044 A1   Apr. 4, 2019

(30) Foreign Application Priority Data

Sep. 29, 2017   (DE) .......................... 10 2017 122 700

(51) Int. Cl.
*F01P 5/12* (2006.01)
*F01P 3/02* (2006.01)
(Continued)

(52) U.S. Cl.
CPC .................................... *F01P 5/12* (2013.01); *F01P 3/02* (2013.01); *F01P 3/20* (2013.01); *F01P 7/162* (2013.01);
(Continued)

(58) Field of Classification Search
CPC .... F01P 5/12; F01P 7/162; F01P 7/164; F01P 3/22; F01P 3/20; F01P 3/02;
(Continued)

(56) References Cited

U.S. PATENT DOCUMENTS 3,749,214 A   7/1973   Leichliter
5,613,588 A * 3/1997   Vu ...................... F16D 25/0638
                                                                188/264 B
(Continued)

FOREIGN PATENT DOCUMENTS

DE   4118684 A1   12/1992
DE   4335342 A1   4/1995
(Continued)

OTHER PUBLICATIONS

Weber, Lukas, Neue LKW-Wasserpumpe—Einfach mal abschalten. In: Frankfurter Allgemeine, Apr. 29, 2013; http://www.faz.net/aktuell/technik-motor/technik/neue-lkw-wasserpumpe-einfach-mal-abschalten-12157500.html?, 9 pages, with English translation.

*Primary Examiner* — Joseph J Dallo
*Assistant Examiner* — Kurt Philip Liethen
(74) *Attorney, Agent, or Firm* — Weber Rosselli & Cannon LLP

(57) ABSTRACT

An internal combustion engine including a cooling liquid circuit, which is connected to a cylinder head and an engine block of the internal combustion engine and which includes a cooling liquid pump. The cooling liquid pump includes a drive shaft and is capable of conveying cooling liquid in the cooling liquid circuit. Further, the internal combustion engine includes a Visco clutch. The Visco clutch is arranged for the drive by the internal combustion engine. The Visco clutch includes a clutch fluid for torque transmission. At the output side, the Visco clutch is connected to the drive shaft of the cooling liquid pump. The drive shaft of the cooling liquid pump include at least one heat pipe. The heat pipe is in heat exchange with the clutch fluid as a heat source and the cooling liquid as a heat sink.

15 Claims, 3 Drawing Sheets

(51) Int. Cl.
- *F01P 3/20* (2006.01)
- *F16D 35/00* (2006.01)
- *F01P 7/16* (2006.01)
- *F16D 35/02* (2006.01)
- *F01P 3/22* (2006.01)

(52) U.S. Cl.
CPC ............ *F01P 7/164* (2013.01); *F16D 35/005* (2013.01); *F01P 2003/021* (2013.01); *F01P 2003/024* (2013.01); *F01P 2003/2278* (2013.01); *F16D 35/022* (2013.01); *F16D 2300/0214* (2013.01)

(58) Field of Classification Search
CPC ......... F01P 2003/2278; F01P 2003/021; F01P 2003/024; F16D 35/005; F16D 35/022; F16D 2300/0214; F16D 2300/021; F16D 35/00; F28D 15/04; F28D 15/02; F04D 15/00; F04D 13/021; F02B 67/04
See application file for complete search history.

(56) References Cited

U.S. PATENT DOCUMENTS

| | | |
|---|---|---|
| 6,481,390 B1 | 11/2002 | Robb |
| 2006/0157002 A1* | 7/2006 | Pfeffinger ............... F01P 7/165 123/41.29 |
| 2010/0044450 A1* | 2/2010 | Roth ....................... B60H 1/038 237/12.3 R |
| 2014/0174086 A1* | 6/2014 | Kare .................... H02K 7/1823 60/670 |
| 2014/0174701 A1* | 6/2014 | Kare .................... F28D 15/043 165/104.26 |
| 2015/0184702 A1* | 7/2015 | Schmidt ................. F16D 35/00 192/58.8 |

FOREIGN PATENT DOCUMENTS

| | | |
|---|---|---|
| DE | 60130756 T2 | 7/2008 |
| DE | 102012201341 A1 | 8/2013 |
| DE | 102016001988 A1 | 9/2016 |
| EP | 0641947 A2 | 3/1995 |

* cited by examiner

TECHNIQUE FOR COOLING FOR AN INTERNAL COMBUSTION ENGINE

BACKGROUND

The present disclosure relates to an internal combustion engine, for example, for driving a motor vehicle. In particular, a technique for cooling a Visco clutch of the internal combustion engine is described.

In motor vehicles, in particular utility vehicles, Visco clutches are used in order to drive a cooling liquid pump of the cooling liquid circuit of the internal combustion engine in a controllable manner. A cooling liquid pump of a lorry which is rigidly coupled to the internal combustion engine would have an average power consumption of, for example, 7 kW. The full power of the cooling liquid pump is (for example, on a horizontal route and travelling at high speed) often not required for adequate heat discharge via the cooling liquid of the internal combustion engine. As a result of a control of the cooling liquid pump which is adapted to requirements, for example, between 0.5 and 1.5 percent of the fuel can be saved. An example of such a conventional control of the cooling liquid pump is described in the article "Einfach mal abschalten" ("Simply switch off") from the Frankfurter Allgemeine Zeitung of 29 Apr. 2013.

The Visco clutch of a controllable cooling liquid pump uses the controllable torque transmission of the Visco clutch. The torque transmission is based on the fluid properties of a clutch fluid in the Visco clutch. For example, viscous silicone oil acts as a clutch fluid. As a result of the different speeds between the drive shaft and output shaft of the Visco clutch, the clutch fluid is sheared and the shearing forces transmit by means of the clutch fluid the torque from the drive shaft to the output shaft. Since the shearing forces are based on the viscosity, that is to say, the internal friction, of the clutch fluid, the torque transmission of the Visco clutch is linked with energy dissipation which is transmitted as heat both inwards (that is to say, into the clutch fluid) and outwards (that is to say, via a housing of the Visco clutch to the environment).

However, the internal heat input impairs the hydraulic properties of the clutch fluid since typically the viscosity and the degree of efficiency of the torque transmission decrease as the temperature of the clutch fluid increases. Consequently, the control range of a conventional Visco clutch is limited in particular at high engine speeds in order not to shorten the service-life of the Visco clutch. This may lead to the paradoxical control situation that the controllable Visco clutch at a high engine speed cannot be controlled for a reduced speed of the cooling liquid pump in order to prevent overheating of the Visco clutch. This means that the cooling liquid pump has to be operated at a power which would not be necessary at all for cooling the internal combustion engine.

Alternative measures for cooling the Visco clutch, such as, for example, the increase of a ribbing on the housing of the Visco clutch are not advantageous. On the one hand, as a result of the increased ribbing, the rotating mass of the Visco clutch is increased and the necessary structural space is increased. On the other hand, this air cooling is particularly inadequate since the cooling liquid pump is switched on with a high engine load, whereby the Visco clutch which is arranged behind the radiator is passed over by the temperature of the cooling air which has also increased.

SUMMARY

The present disclosure is directed at an internal combustion engine with a more energy-efficient cooling. An alternative or additional objective is to increase the ability to control the Visco clutch without limiting the service-life of the Visco clutch. An alternative or additional objective is, regardless of the mechanical loading of the Visco clutch and ambient temperatures, to ensure the most constant temperature possible for the clutch fluid.

This/these objective or objectives is/are achieved by an internal combustion engine and a corresponding motor vehicle of the present disclosure. Advantageous embodiments and applications of the present disclosure are explained in greater detail in the following description, with partial reference to the Figures.

According to an aspect of the present disclosure, an internal combustion engine is provided. The internal combustion engine comprises a cooling liquid circuit which is connected or can be connected to a cylinder head and/or an engine block of the internal combustion engine. The cooling liquid circuit comprises a cooling liquid pump which comprises a drive shaft and is constructed to convey cooling liquid in the cooling liquid circuit. Furthermore, the internal combustion engine comprises a Visco clutch which is arranged or can be arranged for the drive by the internal combustion engine, which comprises a clutch fluid for torque transmission and which is connected at the output side to the drive shaft of the cooling liquid pump. The drive shaft of the cooling liquid pump comprises at least one heat pipe which is in heat exchange or can be brought into heat exchange with the clutch fluid as a heat source and the cooling liquid as a heat sink.

By at least one heat pipe being present in the drive shaft of the controllable cooling liquid pump, the waste heat flow can be effectively transmitted from the clutch fluid as a heat source to the cooling liquid as a heat sink.

At least one heat pipe may be inserted through a longitudinal hole in the drive shaft as an encapsulated unit. Alternatively or additionally, at least one heat pipe may be produced integrally/in one piece with the drive shaft in a longitudinal hole of the drive shaft.

The clutch fluid may comprise an oil, for example, silicone oil. The clutch fluid may as a hydrodynamic operating medium have specific hydraulic properties for torque transmission, for example, a specific temperature-dependent viscosity.

The cooling liquid may comprise water, an antifreeze agent and/or a corrosion prevention agent.

The Visco clutch may comprise plates around which clutch fluid flows. The plates may be connected to the drive shaft in a rotationally secure manner. Via the plates, the heat pipe may be in heat exchange with the clutch fluid as a heat source. For example, the plates are arranged so as to extend around a clutch-side end of the drive shaft. A heat-source-side end of the heat pipe may correspond to the clutch-side end of the drive shaft.

The cooling liquid pump may comprise an impeller (for example, a vane) around which the cooling liquid flows. The impeller may be connected to the drive shaft in a rotationally secure manner. The heat pipe may be in heat exchange via the impeller with the cooling liquid as a heat sink. For example, the impeller is arranged so as to extend around a pump-side end of the drive shaft. A heat-sink-side end of the heat pipe may correspond to the pump-side end of the drive shaft.

The cooling liquid circuit may further comprise a radiator and a thermostat. The cooling liquid pump may be connected at the input side to the radiator and/or the thermostat. The cooling liquid pump may be connected at the output side to the cylinder head and/or the engine block. The radiator and/or the thermostat may be arranged downstream in the cooling liquid circuit with respect to the engine block.

The heat pipe may comprise a capillary or a plurality of capillaries which extend(s) in the longitudinal direction of the drive shaft, for example, from the clutch-side end to the pump-side end of the drive shaft. The capillary or at least one of the capillaries may be arranged coaxially relative to the drive shaft. Alternatively or additionally, the heat pipe may comprise a large number of capillaries (for example, as a result of a porous structure) and be arranged coaxially in the drive shaft. As a result of the coaxial arrangement, centrifugal forces on the heat pipe may be minimised or eliminated.

The heat pipe (for example, the at least one capillary) may comprise a cooling medium (or medium for short). The cooling medium may be constructed to evaporate as a result of thermal contact with the heat source (for example, at the clutch-side end of the drive shaft) and to condense as a result of thermal contact with the heat sink (for example, at the pump-side end of the drive shaft). The heat pipe may be a closed system which contains the cooling medium. The cooling medium may, for example, comprise water or ammonia. The cooling medium may, as a result of capillary forces in the fluid aggregate state, flow from the heat sink (for example, the pump-side end of the drive shaft) to the heat source (for example, the clutch-side end of the drive shaft), for example, in the capillaries or the porous structure.

The flow of the cooling medium in the gaseous state from the heat source to the heat sink may be spatially decoupled from the backflow of the cooling medium in the fluid aggregate state. For example, the heat pipe may comprise a condensation channel which is free of centrifugal force (and which is arranged coaxially in the drive shaft) and a vapour channel which surrounds the condensation channel.

A thermal resistance of a heat line in the metal of the drive shaft may be many times greater than a thermal resistance of a heat transport in the heat pipe. For example, as a result of the coexistence of a fluid and a gaseous phase of the cooling medium in the heat pipe, the clutch-side end of the drive shaft and the pump-side end of the drive shaft may be almost isothermic.

Furthermore, the device may comprise a control unit which controls a degree of coupling of the Visco clutch. For example, the degree of coupling may be controlled in accordance with a temperature of the cooling liquid and/or a temperature gradient in the engine block and/or the cylinder head.

A thermal capacity of the cooling liquid may be many times greater than a thermal capacity of the clutch fluid. As a result of the non-uniform thermal capacities and the low thermal resistance of the heat pipe, the temperature of the clutch fluid may follow or almost correspond to the temperature of the cooling liquid. A control of the cooling liquid may involve a control of the clutch fluid.

As a result of the thermal connection of the clutch fluid to the controlled temperature of the cooling liquid via the at least one heat pipe, a heat-related reduction of the viscosity—and consequently of the torque transmission—in the Visco clutch can be prevented. Consequently, a control range of the controllable Visco clutch can be increased with respect to a conventional air-cooled Visco clutch, for example, may include the entire speed range of the internal combustion engine.

According to another aspect, there is provided a vehicle, for example, a land vehicle or a water-borne vehicle which comprises an internal combustion engine according to an embodiment of the above-mentioned aspect. The land vehicle may in particular be a utility vehicle, for example, a bus, a lorry or a tractor.

BRIEF DESCRIPTION OF THE DRAWINGS

Other features and advantages of the present disclosure are described below with reference to the appended drawings, in which.

DETAILED DESCRIPTION

Figure 1:
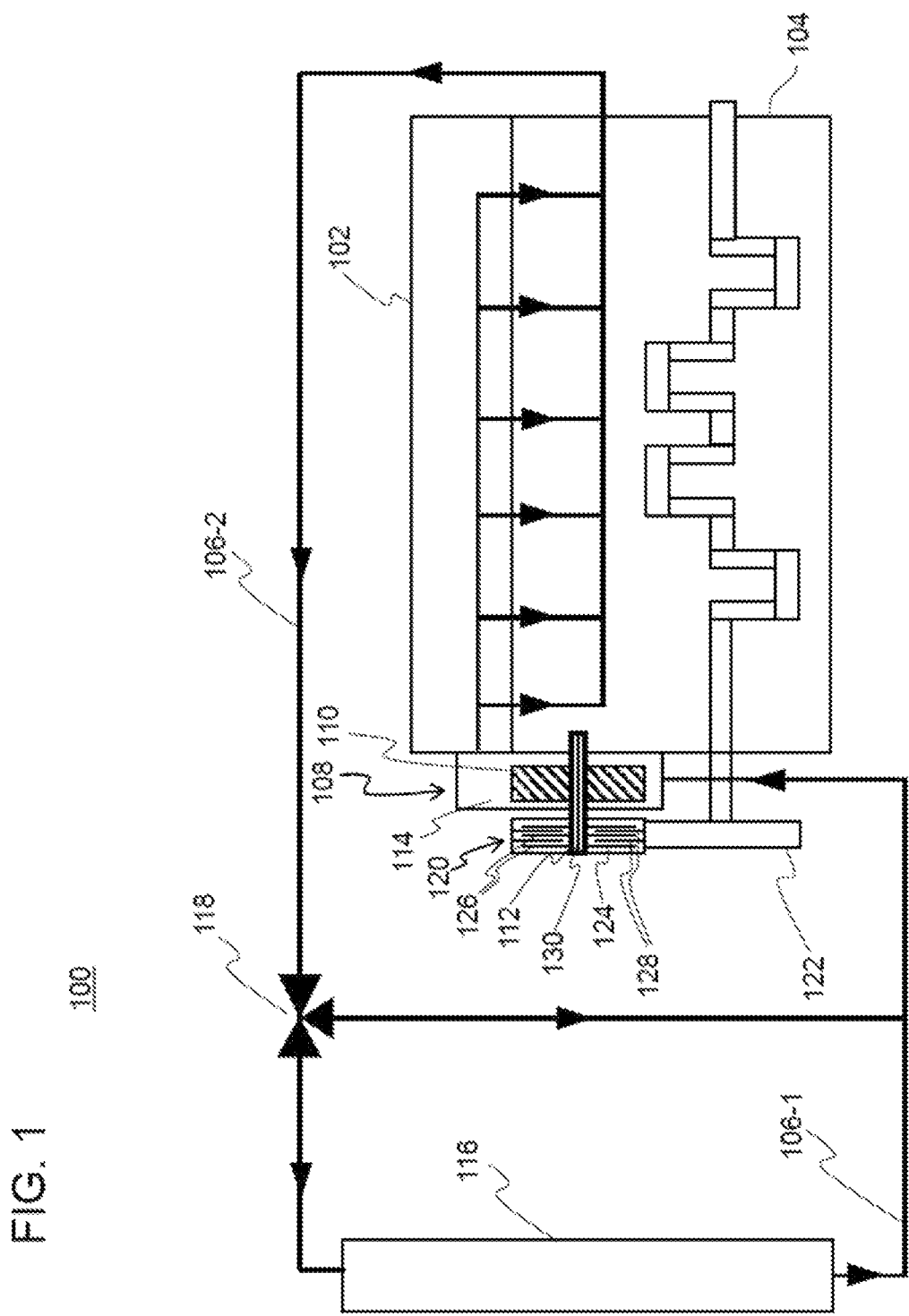
FIG. 1 is a schematic block diagram of a first embodiment of an internal combustion engine.

FIG. 1 shows a first embodiment of an internal combustion engine which is generally designated 100. The internal combustion engine 100 comprises a cylinder head 102 and an engine block 104 which are connected to a cooling liquid circuit which is generally designated 106. The internal combustion engine 100 further comprises a cooling liquid pump 108 which is connected at the input side to a supply 106-1 of the cooling liquid circuit 106. At the output side, the cooling liquid pump 108 is in fluid connection with cooling lines in the cylinder head 102 and in the engine block 104.

The cooling liquid pump 108 comprises in a pump housing an impeller 110 (for example, a vane or a propeller) on a drive shaft 112. The impeller 110 and a pump-side end of the drive shaft 112 are immersed in a cooling liquid of the cooling liquid circuit 106 which fills the pump housing. The cooling liquid 114 comprises, for example, water with additives for increasing the freezing point and reducing the viscosity.

The controllable speed of the cooling liquid pump 108 determines the quantity of cooling liquid 114 circulating in the cooling liquid circuit 106 per unit of time. The cooling liquid circuit 106 comprises a radiator 116 at the hot return flow 106-2 thereof relative to the supply 106-1 downstream of the engine block 104. Optionally, the cooling liquid circuit 106 further comprises a thermostat 118. The thermostat 118 determines a proportion of the cooling liquid 114 flowing through the radiator 116 of the cooling liquid 114 circulating as a whole through the internal combustion engine.

The drive shaft 112 is connected to the output of a Visco clutch 120 which is arranged for the drive 122 by the internal combustion engine 100. The drive 122 of the Visco clutch 120 may comprise a gear mechanism with a fixed transmission ratio relative to the crankshaft of the internal combustion engine 100. The Visco clutch 120 comprises a clutch fluid 124 whose viscosity transmits the torque applied at the drive side to outer plates 128 to internal plates 126. The internal plates 126 are arranged at a clutch-side end of the drive shaft 112 in a rotationally secure manner on the drive shaft 112.

At least one heat pipe 130 for directing heat from the clutch fluid 124 to the cooling liquid 114 is arranged in the drive shaft 112. For example, the clutch-side end of the heat pipe 130 is in heat exchange via the inner plates 126 with the clutch fluid 124 as a heat source. The pump-side end of the heat pipe 130 is in heat exchange via the impeller 110 with the cooling liquid 114 as a heat sink.

Figure 2:
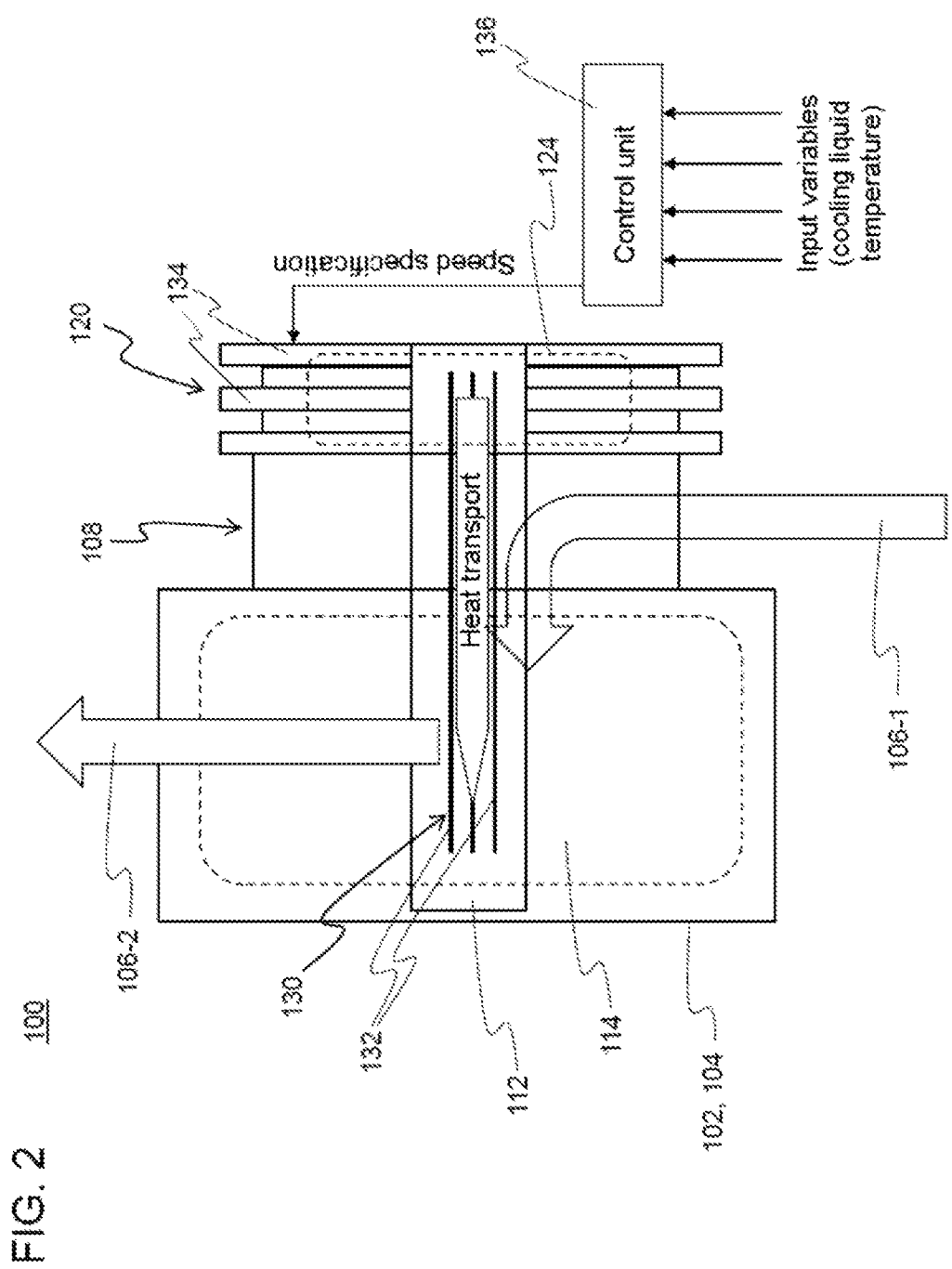
FIG. 2 is a schematic block diagram of a second embodiment of the internal combustion engine.

FIG. 2 is a schematic block diagram of a second embodiment of the internal combustion engine 100. Individual features of the second embodiment can be combined with those of the first embodiment and/or can replace them. In particular corresponding or interchangeable features are provided with corresponding reference numerals.

In order to improve the effectiveness of the heat transfer between the clutch fluid 124 and cooling liquid 114, in the heat pipe 130 a thermally convecting cooling medium is used as a coolant. Organic and/or inorganic coolants (which, for example, could also be used as a refrigerant) are used as a cooling medium. A clutch-side first end of the heat pipe which is in thermal contact with the Visco clutch 120 (more specifically, the clutch fluid 124) as a heat source acts as an evaporator of the cooling medium in the heat pipe 130. A pump-side second end of the heat pipe 130 opposite the first end is in thermal contact with the cooling liquid pump 108 (more specifically: the cooling liquid 114) as a heat sink and acts as a condenser of the cooling medium.

The heat pipe 130 comprises a capillary 132 or a plurality of capillaries 132 in which the cooling medium is enclosed. As a result of capillary forces, the cooling medium flows in the fluid aggregate state from the pump-side second end to the clutch-side first end. Consequently, a recirculation of the cooling medium is achieved for an effective heat transport along the drive shaft 112.

The heat pipe 130 which is installed in the drive shaft 112 enables an almost constant temperature of the clutch fluid 124 as a result of the close thermal connection to the controlled temperature of the cooling liquid 114. Since the temperature of the clutch fluid 124 influences the degree of efficiency of the Visco clutch 120, a heat-related slip effect is prevented or considerably reduced.

In contrast to a conventional cooling of a Visco clutch, for example, only with cooling air as a result of the increase of a contact surface of the Visco clutch, the effective thermal connection to the cooling liquid 114 enables a reduction of the cooling ribs 134 on the Visco clutch 120 or enables such cooling ribs 134 to be dispensed with. As a result, production costs of the Visco clutch 120 and the weight of the Visco clutch 120 can be reduced.

As a result of the integration of the heat pipe 130 in the drive shaft 112, a conventional air cooling of the Visco clutch 120 is no longer necessary or can be considerably reduced. The costs and the structural space for the Visco clutch 120 are thereby reduced. A service-life of the Visco clutch 120 as a result of the stable constant temperature of the clutch fluid 124 can be extended compared with conventional Visco clutches.

In each embodiment, the internal combustion engine 100 may comprise a control unit 136 which controls the speed of the cooling liquid pump 108 by means of the Visco clutch 120. Since the control of the pump speed is dependent on the input variables of the control unit 136, such as, for example, the measured temperature of the cooling liquid 114 and/or a measured temperature gradient in the cylinder head 102 and/or engine block 104, this temperature or this temperature gradient is controlled. The control unit 136 can be referred to as control of the speed of the cooling liquid pump 108.

Figure 3:
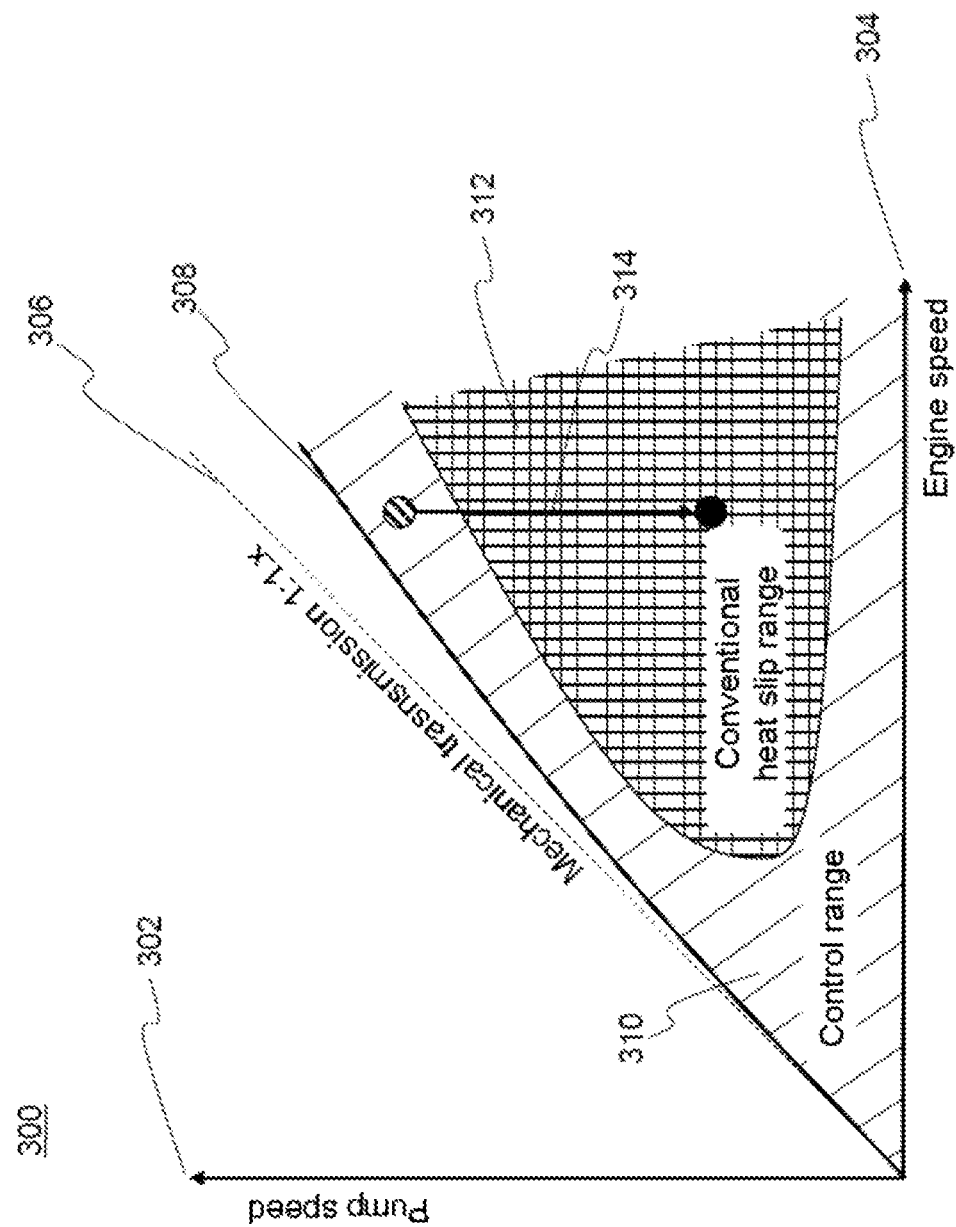
FIG. 3 is a speed graph for controlling a controllable Visco clutch which can be implemented in every embodiment.

FIG. 3 is a schematic speed graph 300 for controlling the Visco clutch 120 and consequently the speed 302 of the cooling liquid pump 108. The control schematically illustrated in the graph 300 can be used in each embodiment of the internal combustion engine 100.

The speed 304 of the internal combustion engine (that is to say, the speed of the crankshaft) is indicated on a horizontal axis. The origin 306 represents the mechanical transmission ratio (for example, 1:1.8 with respect to the crankshaft), that is to say, the speed of the drive 122 of the Visco clutch 120. As a result of the slip required to transmit torque even with a Visco clutch 120 coupled to the maximum extent, the maximum speed 308 at the output side of the Visco clutch 120, that is to say, the maximum speed 308 of the drive shaft 112, is lower than the speed 306. This minimum slip is with a small load or insignificant motor speed 304 and increases with the load or engine speed 304.

As a result of the fixed thermal connection of the clutch fluid 124 via the heat pipe 130 to the cooling liquid 114, the entire control range 310 below the maximum speed 308 of the control unit 136 may be available to control the Visco clutch 120. A limitation of the control range 310 by a conventional heat slip range may be dispensed with as a result of the thermal connection via the heat pipe 130.

The conventional heat slip range 312 may occur as a result of a high thermal capacity at a high engine speed 304 and/or high shearing forces (that is to say, high load torque) in the clutch fluid of a conventional Visco clutch (for example, only with air cooling) and may lead to an uncontrolled temperature increase in the clutch fluid 124 so that, as a result of the viscosity which decreases with the temperature and/or an overheating of the clutch fluid 124, the conventional heat slip range 312 is not available when a conventional Visco clutch is controlled.

As a result of the temperature of the clutch fluid 124 which is controlled via the at least one heat pipe 130, the heat slip range may be reduced or irrelevant for the control range 310. As a result, for example, at a high engine speed 304 and a low power requirement of the cooling liquid pump 108 (for example, during motorway travel with horizontal roadway or with a decline), a reduction 314 of the pump speed 302 and consequently a saving of fuel are enabled. This possibility is not available with a conventional Visco clutch as a result of the conventional heat slip range 312 of the control.

Although the present disclosure has been described with respect to exemplary embodiments, it can be seen by a person skilled in the art that different modifications can be carried out and equivalents can be used as a replacement. Furthermore, many modifications can be carried out in order to adapt the teaching of the present disclosure to power ranges or applications of the internal combustion engine. Consequently, the present disclosure is not limited to the embodiments disclosed, but instead includes all embodiments which are within the scope of the disclosure.

LIST OF REFERENCE NUMERALS

100 Internal combustion engine
102 Cylinder head of the internal combustion engine
104 Engine block of the internal combustion engine
106 Cooling liquid circuit
108 Cooling liquid pump of the cooling liquid circuit
110 Impeller of the cooling liquid pump
112 Drive shaft of the cooling liquid pump
114 Cooling liquid
116 Radiator of the cooling liquid circuit
118 Thermostat of the cooling liquid circuit
120 Visco clutch
122 Drive of the Visco clutch
124 Clutch fluid
126 Inner plates of the Visco clutch
128 Outer plates of the Visco clutch
130 Heat pipe 132 Capillary of the heat pipe
134 Cooling ribs of the Visco clutch
136 Control unit
300 Speed graph
302 Pump speed
304 Engine speed
306 Drive-side speed of the Visco clutch
308 Output-side maximum speed of the Visco clutch
310 Control range of the Visco clutch
312 Conventional heat slip range
314 Reduction of the pump speed

We claim:

1. An internal combustion engine, comprising:
a crankshaft
a cooling liquid circuit, which is connected or can be connected to a cylinder head and/or an engine block of the internal combustion engine and which comprises a cooling liquid pump which includes a drive shaft and which is constructed to convey cooling liquid in the cooling liquid circuit; and
a viscous clutch, which is arranged or can be arranged to be driven by the crankshaft, and which includes clutch fluid for torque transmission and which is connected at the output side to the drive shaft of the cooling liquid pump,
wherein the drive shaft of the cooling liquid pump includes at least one heat pipe which is or can be brought into heat exchange with the clutch fluid as a heat source and the cooling liquid as a heat sink.

2. The internal combustion engine according to claim 1, wherein the internal combustion engine is operably connected to a motor vehicle.

3. The internal combustion engine according to claim 1, wherein the viscous clutch includes plates around which the clutch fluid flows and which are connected to the drive shaft in a rotationally secure manner and via which the heat pipe is in heat exchange with the clutch fluid as a heat source.

4. The internal combustion engine according to claim 1, wherein the cooling liquid pump includes an impeller around which the cooling liquid flows and which is connected to the drive shaft in a rotationally secure manner and via which the heat pipe is in heat ex-change with the cooling liquid as a heat sink.

5. The internal combustion engine according to claim 1, wherein the cooling liquid circuit further includes a radiator and a thermostat.

6. The internal combustion engine according to claim 1, wherein the heat pipe includes at least one which extends in the longitudinal direction of the drive shaft.

7. The internal combustion engine according to claim 6, wherein the at least one capillary of the heat pipe is arranged coaxially relative to the drive shaft.

8. The internal combustion engine according to claim 6, wherein the at least one capillary includes a medium, which is constructed to evaporate as a result of thermal contact with the heat source and to condense as a result of thermal contact with the heat sink.

9. The internal combustion engine according to claim 8, wherein the heat pipe is a closed system which contains the medium.

10. The internal combustion engine according to claim 1, wherein a thermal resistance of a heat line in the metal of the drive shaft is many times greater than a thermal resistance of a heat transport in the heat pipe.

11. The internal combustion engine according to claim 1, further comprising a control unit which is constructed to control a degree of coupling of the viscous clutch in accordance with a temperature of the cooling liquid.

12. The internal combustion engine according to claim 1, wherein the heat pipe is arranged coaxially in the drive shaft.

13. The internal combustion engine according to claim 1, wherein a thermal capacity of the cooling liquid is many times greater than a thermal capacity of the clutch fluid.

14. A motor vehicle, comprising:
an internal combustion engine including,
a crankshaft
a cooling liquid circuit, which is connected or can be connected to a cylinder head and/or an engine block of the internal combustion engine and which comprises a cooling liquid pump which includes a drive shaft and which is constructed to convey cooling liquid in the cooling liquid circuit; and
a viscous clutch, which is arranged or can be arranged to be driven by the crankshaft, and which includes clutch fluid for torque transmission and which is connected at the output side to the drive shaft of the cooling liquid pump,
wherein the drive shaft of the cooling liquid pump includes at least one heat pipe which is or can be brought into heat exchange with the clutch fluid as a heat source and the cooling liquid as a heat sink.

15. The motor vehicle according to claim 14, wherein the motor vehicle is a utility vehicle.

\* \* \* \* \*